(12) United States Patent
McDaniel

(10) Patent No.: US 10,170,022 B2
(45) Date of Patent: Jan. 1, 2019

(54) PHOTOLUMINESCENT RETROREFLECTOR

(71) Applicant: Hunter McDaniel, Los Alamos, NM (US)

(72) Inventor: Hunter McDaniel, Los Alamos, NM (US)

(73) Assignee: UbiQD, Inc., Los Alamos, NM (US)

( * ) Notice: Subject to any disclaimer, the term of this patent is extended or adjusted under 35 U.S.C. 154(b) by 171 days.

(21) Appl. No.: 14/736,184

(22) Filed: Jun. 10, 2015

(65) Prior Publication Data
US 2015/0279250 A1 Oct. 1, 2015

(51) Int. Cl.
| B60Q 7/00 | (2006.01) |
|---|---|
| F21V 7/00 | (2006.01) |
| F21V 9/30 | (2018.01) |
| G09F 13/04 | (2006.01) |
| G09F 13/16 | (2006.01) |
| F21W 111/10 | (2006.01) |

(52) U.S. Cl.
CPC .............. *G09F 13/16* (2013.01); *B60Q 7/00* (2013.01); *F21V 7/0008* (2013.01); *F21V 9/30* (2018.02); *F21W 2111/10* (2013.01); *G09F 2013/0472* (2013.01)

(58) Field of Classification Search
CPC ... G09F 13/16; G09F 2013/0472; B60Q 7/00; F21V 7/0008; F21V 9/16; F21W 2111/10
See application file for complete search history.

(56) References Cited

U.S. PATENT DOCUMENTS

| 4,250,646 A * | 2/1981 | Trachtenberg ......... G09F 13/16 40/561 |
|---|---|---|
| 5,759,671 A * | 6/1998 | Tanaka .................... G02B 5/124 250/461.1 |
| 2005/0220675 A1* | 10/2005 | Reed ...................... B01L 3/5025 422/400 |
| 2007/0187580 A1* | 8/2007 | Kykta ................... H04N 9/3129 250/227.15 |
| 2009/0211131 A1* | 8/2009 | Perez ...................... G09F 13/16 40/542 |
| 2012/0064134 A1* | 3/2012 | Bourke, Jr. ............. A61Q 17/04 424/401 |
| 2014/0098515 A1* | 4/2014 | Pickett .................... G09F 13/02 362/23.13 |

* cited by examiner

*Primary Examiner* — Mary Ellen Bowman
(74) *Attorney, Agent, or Firm* — John A. Fortkort; Fortkort & Houston PC

(57) ABSTRACT

Common approaches to retroreflectors rely on absorptive materials that waste light energy that could be utilized for visibility. Disclosed photoluminescent retroreflectors filter reflected light, like traditional colored retroreflectors, but down-convert photons of the wrong color into a glow visible from more directions. The glow enables visibility for more observers or observers whose light source is far from their line of sight. The color of the glow can be adjusted by choice of luminescent material as a design feature or safety purpose. Certain embodiments utilize photoluminescent additives within a retroreflector while other embodiments utilize a photoluminescent coating on top of a pre-made retroreflector. An exemplary photoluminescent material for these optical devices is $CuInZnS_2$ quantum dots.

27 Claims, 5 Drawing Sheets

PHOTOLUMINESCENT RETROREFLECTOR

BACKGROUND OF THE INVENTION

1. Field of the Invention

This disclosure concerns optical devices involving a photoluminescent materials such as quantum dots within or on top of a retroreflector and methods of using them for safety and design.

2. Description of the Prior Art

Retroreflective materials, or materials that reflect light back to the source, have been around since the early 1900's when road safety reflectors were used on vehicles such as horse-drawn buggies, cars, bikes, and motorcycles before finding demand in improving pedestrian visibility.

The first patent for a reflector was granted to Rudolf Straubel in 1906 (U.S. Pat. No. 835,648 A). Straubel teaches that his invention was an improvement of Beck's "triple mirror" system and did not describe any specific uses. In 1912, Robert Venner patented a method of increasing the visibility of signs (U.S. Pat. No. 1,048,008 A) using partially transparent marble-sized glass beads, also known as cataphotes or "cat's eyes", or grooves arranged as to give the effect of luminous letter or images when illuminated from behind. Venner invention was used widely in the 1920s in Great Britain in order to increase the visibility of traffic signs. Jonathan Stimson was granted the first patent for a "triple reflector" in 1923 (U.S. Pat. No. 1,743,834 A) which could be grouped together could give the effect of luminous designs on safety signs (U.S. Pat. No. 1,809,761 A) when illuminated from the front.

In the 1920's and '30s, the growth in car and bicycle usage drew increasing attention to traffic safety. In Europe the first traffic laws were going into effect and some of those included mandatory bike reflectors. In 1933, Branson Edward H was awarded a patent for road signs incorporating cataphote reflectors (U.S. Pat. No. 2,071,294 A) that were intended to make warning signs more visible at railway crossings. That same year Great Britain installed cataphotes in some roadways. In 1949, General Motors received a patent for a combination of plastic reflector with a car tail light (U.S. Pat. No. 2,685,231 A). What made these developments distinguishing was the specific utilization/reflection of light incident from automobile headlights.

The first mention that pedestrians should also attempt to make themselves more visible on roadways, was published in the January 1943 issue of Popular Science. There is no record of any invention by US highway police officer Raymond Trask, but the Popular Science article describes his "red reflectors glow at car's approach". This is also the first known report of a color-filtered reflecting device but it was not clear how the red color was to be produced. Widespread use of pedestrian reflectors notably occurred in Finland in the 1960s, with the development of plastic prism reflectors. Through various public campaigns, reflector use by Finish pedestrians had reached approximately 40% by the end of the decade while pedestrian traffic accents fell by about 80%.

In 1958, Alfred Nellessen patented retroreflective coatings containing tiny glass beads (U.S. Pat. No. 3,099,637 A) that could make essentially any ordinary surface reflect light back towards the source, specifically with car headlights in mind. This technology is now widely used in road markings and signage. Although adoption of these technologies increased dramatically over the years, few improvements have been made. Current generations of road safety retroreflectors fall into two categories; 1) plastic cube corner prism reflectors that can be colored by color-filtering pigments and 2) coatings that contain microspheres that sit on top of or underneath traditional paint of any color.

The current generation of retroreflectors have two major drawbacks that limit their utility. First, all reflective coloring results from absorptive filtering that waste incident light. For example, a red plastic bike reflector absorbs all visible colors except red, and reflects the red light. The blue, green, yellow, and other spectral components of incident headlights are absorbed and lost when incident on a red bike reflector. Second, retroreflectors work very well at reflecting directly to the light source, but the light source is not necessarily close to the eyes of an observer. A particularly problematic example is with large trucks where the headlights can be several meters from the line of sight of the driver. A photoluminescent retroreflector may solve both problems by down-converting light to a luminous glow that would have been thrown away by color-filtering.

Photoluminescence (PL) is the emission of light (electromagnetic radiation, photons) after the absorption of light. It is one forms of luminescence (light emission) and is initiated by photoexcitation (excitation by photons). Following photon excitation, various charge relaxation processes can occur in which other photons with a lower energy are re-radiated. Time periods between absorption and emission may vary: ranging from short femtosecond-regime for emission involving free-carrier plasma in inorganic semiconductors up to milliseconds for phosphorescent processes in molecular systems; and under special circumstances delay of emission may even span to minutes or hours.

Colloidal semiconductor nanocrystals, commonly known as quantum dots (QDs), are known for their size-tunable optical properties, including PL, and their inexpensive processability from liquids. In particular, they are very effective at absorbing a broad spectrum of light and then converting that energy into emitted light of a single color that is determined by their size. Optical properties (absorption and emission spectra) can be programmed in by tailoring the manufacturing conditions to realize different sizes, shapes, and/or compositions. This fundamental property of QDs has spurred research and development of fluorescence biolabeling, color-specific light-emitting-diodes, and vibrant displays. However, the current generation of QDs are toxic and far too expensive to reach most markets. There is a unique opportunity for QDs that are both low-cost and non-toxic as active elements of luminescent composites for improved road safety (e.g., making objects more visible) and design (e.g., eye-catching fluorescent pigments).

Nanocrystal quantum dots of the I-III-VI class of semiconductors, such as $CuInS_2$, are of growing interest for applications in optoelectronic devices such as solar photovoltaics (PVs, Stolle, C. J.; Harvey, T. B.; Korgel, B. A. Curr. Opin. Chem. Eng. 2013, 2, 160) and light-emitting diodes (Tan, Z.; Zhang, Y.; Xie, C.; Su, H.; Liu, J.; Zhang, C.; Dellas, N.; Mohney, S. E.; Wang, Y.; Wang, J.; Xu, J. Advanced Materials 2011, 23, 3553). These quantum dots exhibit strong optical absorption and stable efficient photoluminescence that can be tuned from the visible to the near-infrared (near-IR, Zhong, H.; Bai, Z.; Zou, B. J. Phys. Chem. Lett. 2012, 3, 3167) through composition and quantum size effects. In fact, Gratzel cells sensitized by specifically engineered CISeS quantum dots have recently been shown to offer excellent stability and certified power conversion efficiencies of >5%. (McDaniel, H.; Fuke, N.; Makarov, N. S.; Pietryga, J. M.; Klimov, V. I. Nat. Commun. 2013, 4, 2887.) $CuInZnS_2$ QDs ($CuInS_2$ alloyed with ZnS) are particularly attractive for luminescent retroreflectors because of their large intrinsic Stokes shift (separation between absorption and emission of the QDs) that prevents self-absorption of the PL. In the luminescent retroreflectors disclosed herein, the luminescence must be able to pass through the luminescent element without being re-absorbed which leads to significant losses, similar to what occurs in luminescent solar concentrators (Meinardi, F., Colombo, A., Velizhanin, K. A., Simonutti, R., Lorenzon, M., Beverina, L., Viswanatha, R., Klimov, V. I. & Brovelli, S. Nat. Photon. 2014, 8, 392.).

Another prior art is the J. Wallace Parce patent for QD-doped matrixes for use as down-converting layers (U.S. Pat. No. 7,374,807 B2). The Parce patent does describe "polymeric layers [containing nanocrystals] used to coat optical devices (e.g., refractive lenses or reflective elements)" but not retroreflective elements for safety or design applications, and they explicitly left out enabling I-III-VI QDs. Typical QDs have a small Stokes shift (separation between absorption and photoluminescence) which causes the emission to be self-absorbed. Attempts to solve this problem with thick shells, of CdS for example, has led to a big variation between the absorptive pigment of the composite from the luminescence. In other words, CdSe/CdS QDs generally appear yellow (due to absorbance coming from yellow CdS) but their PL is red (coming from red-emitting CdSe). Furthermore, the invention herein overcomes the toxicity and cost problems with previous generations of QDs enabling safety and design uses of never previously imagined luminescent retroreflectors.

SUMMARY OF THE INVENTION

Colored retroreflectors are highly desirable for improving the nighttime visibility of vehicles, pedestrians, road markings, and signage. Existing methods for coloring safety retroreflectors rely on absorptive materials that waste light energy that could be utilized for visibility. While retroreflectors are effective at returning light towards the light source, the source of light may be off angle from the intended observer of the reflector.

Disclosed herein are photoluminescent optical devices and coatings for achieving enhanced visibility on roads under low light conditions, such as at night. The invention is an improvement on previous generations of retroreflectors wherein incident light is partially reflected back towards the source and partially down-converted to cause the device or coating to glow in many different directions. The color of the reflected light can be adjusted with the choice of photoluminesent material or a second optical component. The color of the glow is determined by the choice of the photoluminesent material. An exemplary photoluminescent material for this purpose is $CuInZnS_2$ quantum dots.

DETAILED DESCRIPTION OF THE INVENTION

1. Definitions and Abbreviations

Figure 1:
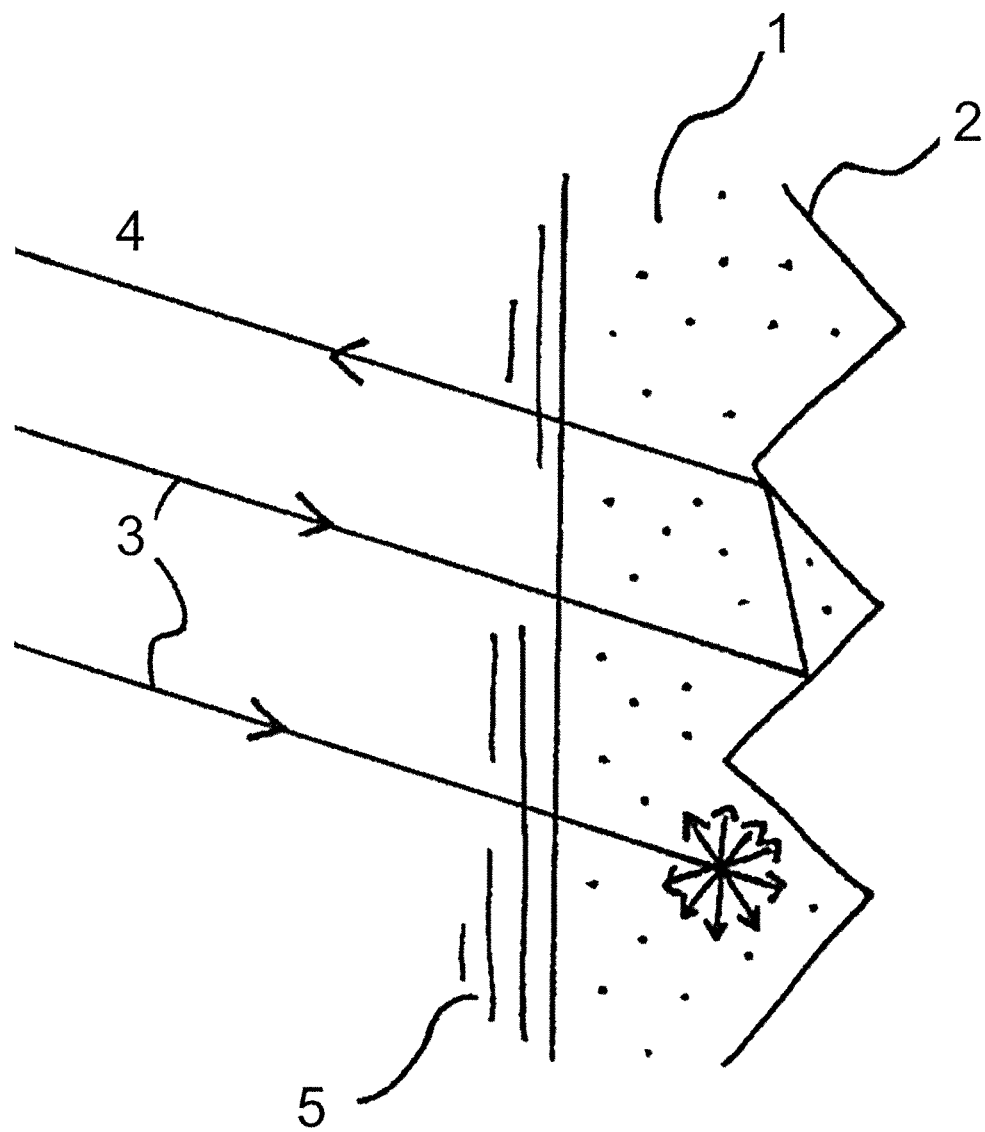
FIG. 1 is a schematic of a cross-section of the photoluminescent retroreflector where the luminescence comes from an additive embedded within the reflecting element, creating a colored glow.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Unless otherwise indicated, non-numerical properties such as colloidal, continuous, crystalline, and so forth as used in the specification or claims are to be understood as being modified by the term "substantially," meaning to a great extent or degree. Accordingly, unless otherwise indicated, implicitly or explicitly, the numerical parameters and/or non-numerical properties set forth are approximations that may depend on the desired properties sought, limits of detection under standard test conditions/methods, limitations of the processing method, and/or the nature of the parameter or property. When directly and explicitly distinguishing embodiments from discussed prior art, the embodiment numbers are not approximates unless the word "about" is recited.

Glow: Emission of light in many different directions from a surface resulting from photoluminescence and/or scattering.

Photoluminescence: Abbreviated PL. The emission of light (electromagnetic radiation, photons) after the absorption of light. It is one form of luminescence (light emission) and is initiated by photoexcitation (excitation by photons).

Polymer: A large molecule, or macromolecule, composed of many repeated subunits. Polymers range from familiar synthetic plastics such as polystyrene or Poly(methyl methacrylate) (PMMA) to natural biopolymers such as DNA and proteins that are fundamental to biological structure and function. Polymers, both natural and synthetic, are created via polymerization of many small molecules, known as monomers. Exemplary polymers include poly(methyl methacrylate) (PMMA), polystyrene, silicones, epoxy resins, and nailpolish.

Toxic: Denotes a material that can damage living organisms due to the presence of phosphorus or heavy metals such as cadmium, lead, or mercury.

Quantum dot: Abbreviated QD. A nanoscale particle that exhibits size-dependent electronic and optical properties due to quantum confinement. The quantum dots disclosed herein generally have at least one dimension less than about 50 nanometers. The disclosed quantum dots may be colloidal quantum dots, i.e., quantum dots that may remain in suspension when dispersed in a liquid medium. Some quantum dots are made from a binary semiconductor material having a formula MX, where M is a metal and X typically is selected from sulfur, selenium, tellurium, nitrogen, phosphorus, arsenic, antimony or mixtures thereof. Exemplary binary quantum dots include CdS, CdSe, CdTe, PbS, PbSe, PbTe, ZnS, ZnSe, ZnTe, InP, InAs, $Cu_2S$, and $In_2S_3$. Other quantum dots are ternary, quaternary, and/or alloyed quantum dots including, but not limited to, ZnSSe, ZnSeTe, ZnSTe, CdSSe, CdSeTe, HgSSe, HgSeTe, HgSTe, ZnCdS, ZnCdSe, ZnCdTe, ZnHgS, ZnHgSe, ZnHgTe, CdHgS, CdHgSe, CdHgTe, ZnCdSSe, ZnHgSSe, ZnCdSeTe, ZnHgSeTe, CdHgSSe, CdHgSeTe, $CuInS_2$, $CuInS_2$, $CuInGaSe_2$, $CuInAlS_2$, $CuZnSnSe_2$, $CuIn(Se,S)_2$, $CuZn(Se,S)_2$, and $CuSn(Se,S)_2$ quantum dots. Embodiments of the disclosed quantum dots may be of a single material, or may comprise an inner core and an outer shell, e.g., a thin outer shell/layer formed by any suitable method, such as cation exchange. The quantum dots may further include a plurality of ligands bound to the quantum dot surface.

Retroreflector: An optical device that partially or fully reflects light towards the light's source. Exemplary retroreflectors are cube-corner textured surfaces, prisms, cataphotes, "cat's eyes", glass microspheres, and mirrors at right angles.

2. Best Mode of the Invention

The best mode of the invention disclosed herein is a retroreflector (see FIG. 1) that incorporates the luminescent material 1 as both the color filtering component and the source of a glow 5. Incident light 3 can be reflected back towards the source 4 by the retroreflecting element or interface 2, or the light can be absorbed by the luminescent additive to undergo PL which produces a glow 5. A red plastic bike reflector typically has a non-luminescent red organic pigment in the plastic that filters (by light absorption) the colors of a white-light spectrum other than red. This means that a large portion of the incident white light is lost to absorption (and not down-converted to luminescence). In a photoluminescent retroreflector incorporating the luminescent material as the color filter and down-converter, the primary loss is the non-100% down-conversion process efficiency, known as quantum yield. The best dyes and QDs have quantum yields (% photons emitted divided by photons absorbed) of around 90%, so in principle most of the incident light can be either retroreflected or emitted as a glow in the mode of the invention shown in FIG. 1.

3. How to Make and Use the Best Mode of the Invention

For making the best mode shown in FIG. 1, a luminescent pigment can be a drop-in replacement for the non-emissive pigments used in existing retroreflectors. For example, in a plastic bike reflector made by injection molding or polymerization, QDs or other luminescent additive can be added to the polymer or monomer prior to the retroreflector shaping step.

For the coating mode shown in FIG. 3 (described below), the luminescent coating can be applied to an existing retroreflector by dip coating, spray deposition, spin coating, printing, or any other form of coating deposition.

Figure 2:
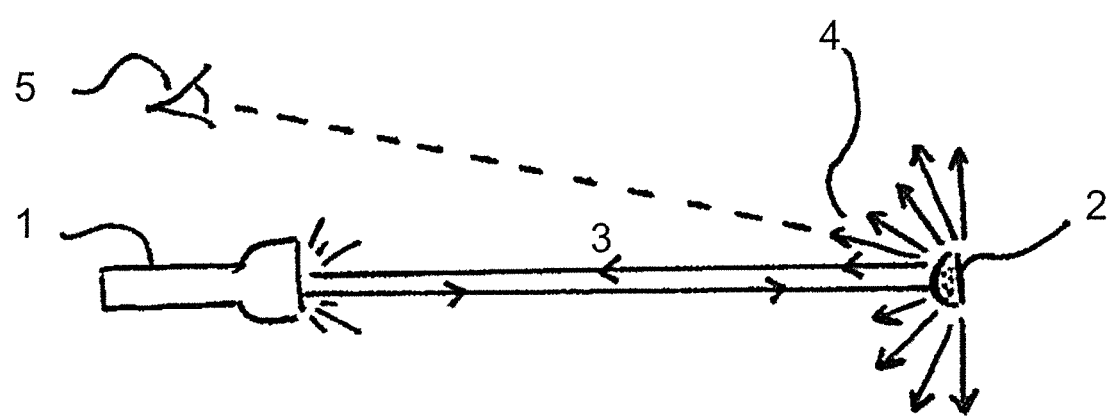
FIG. 2 is a schematic of how the photoluminescent retroreflector enhances visibility when observer is in a different location than the light source because of the colored glow.

The best method of using the above or other modes of the invention is for increasing the visibility of any person or object for safety or design (FIG. 2). A light source such as car headlights or a flashlight 1 is incident on the luminescent retroreflector 2. Some portion of the light is reflected back to the source 3 but the luminescent retroreflector also glows 4 in order to enhance the visibility of a pedestrian, cyclist, sign, or other object that has the retroreflector 2 attached for an observer 5 such as an automobiles driver that may not be in the exact location of the light source 1. The choice of luminescent pigment color adds an element of design to the invention where the color can be tuned for various purposes. Commonly, bike reflectors are red, but many signs have yellow, orange, or green coloration. The choice of luminescent pigment can be chosen for safety or design reasons in the best method.

4. Examples

Figure 3:
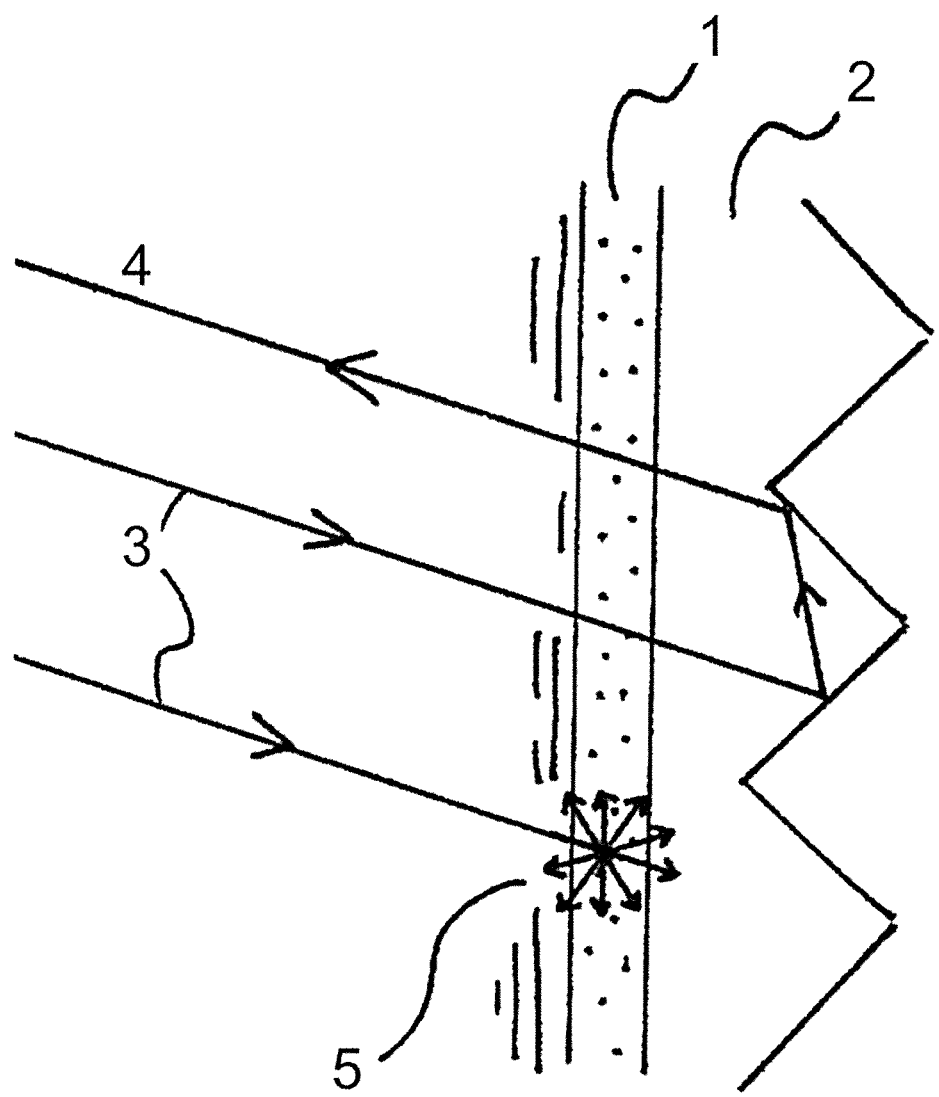
FIG. 3 is a schematic of a cross-section of the photoluminescent retroreflector where the luminescence comes from a coating on top of the retroreflecting element, creating a colored glow.

Red Plastic Cube Corner Bike Reflector with Luminescent Coating:

FIG. 3 shows a luminescent coating 1 applied to the top surface of a pre-made retroreflector 2, essentially converting the retroreflector to a photoluminescent retroreflector. This embodiment functions similarly to the best mode above where incident light 3 can be reflected back towards the source 4 by the retroreflecting element 2, or the light can be absorbed by the luminescent coating to undergo PL which produces a glow 5. The retroreflecting element 2 can be either visibly transparent or include a color-filtering pigment. Choosing different colors for the luminescent coating 1 and the retroreflector 2 could have certain design advantages, such as different coloring under different lighting conditions. In a luminescent retroreflector incorporating a non-luminescent pigment in the reflecting element 2 could introduce optical absorption losses to the device.

Figure 4:
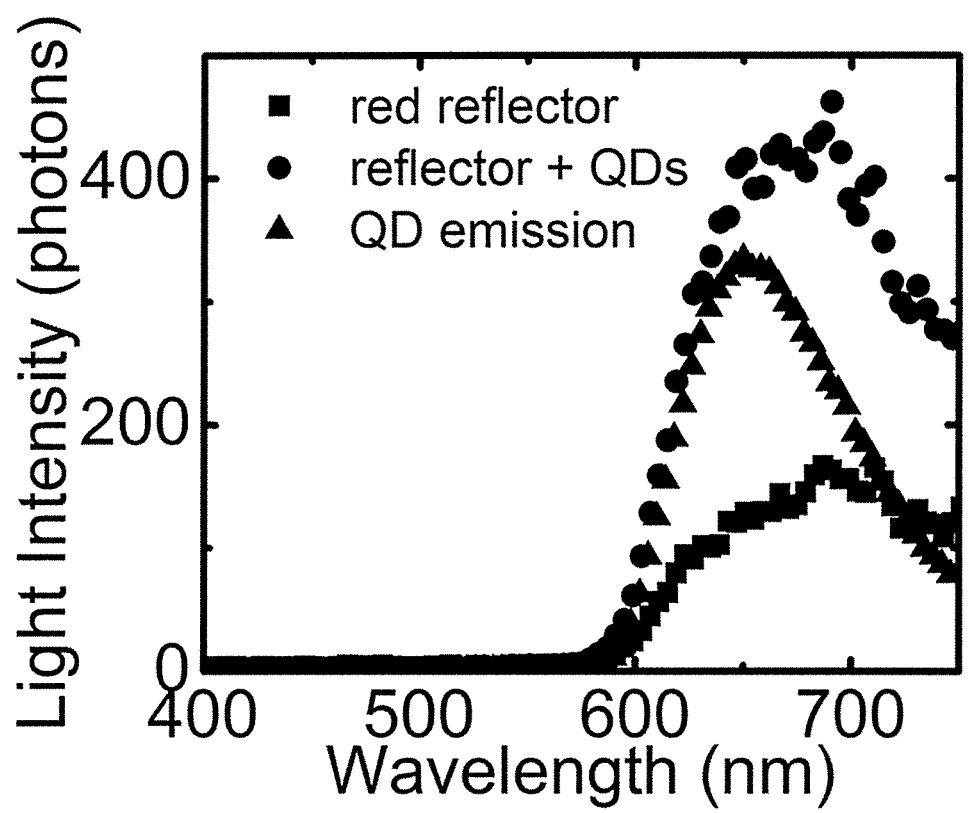
FIG. 4 is a graph comparing the light produced from a red bike retroreflector with light produced from the same red bike retroreflector having a luminescent QD coating with the QD emission spectrum shown.
Figure 5:
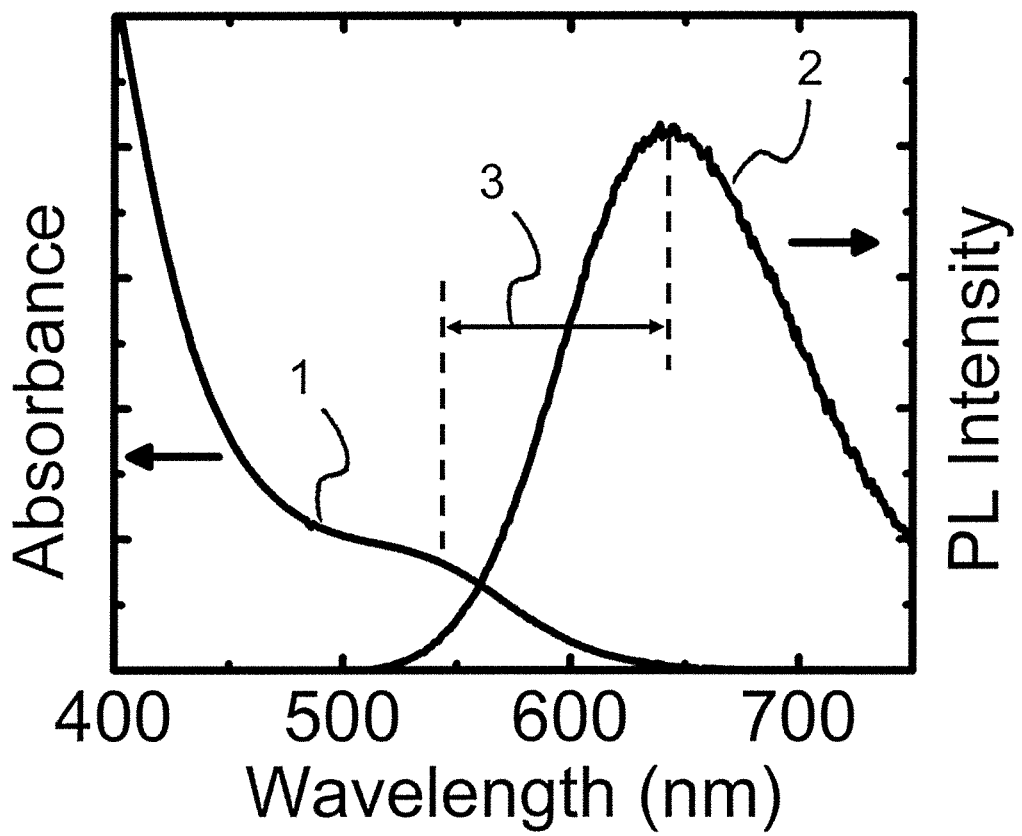
FIG. 5 is a graph of a typical absorption and photoluminescence spectra for exemplary $CuInZnS_2$ quantum dots that are substantially free of toxic elements.

As a test of the concept, a luminescent polymer coating containing $CuInZnS_2$ QDs was applied to the top surface of a red bike reflector. The coating had a quantum yield of approximately 50% with emission at ~650 nm (red). The modified reflector was irradiated with white light from a xenon lamp and all of the photons produced (by reflection, scattering, luminescence, etc) were counted and spectrally resolved at a 90 degree angle. FIG. 4 shows the results of the experiment. The bike reflector with the luminescent QD coating (FIG. 4 circles) produced 124% more photons than the reflector prior to coating (FIG. 4 squares) and the enhancement spectrally matched the PL spectrum of the coating when excited at 500 nm (FIG. 4 triangles). The complete absorption 1 and PL 2 spectra for the QDs used in the study are shown in FIG. 5, where the separation between absorption and PL (Stokes shift) 3 can be clearly observed. This example demonstrates the major advantages of a luminescent retroreflector, namely, significantly enhanced emission of color-specific photons at off angles. The $CuInZnS_2$ QDs in this example (FIG. 5) are particularly well-suited because their emission aligns well with the typical red pigments used in road safety reflectors, while avoiding toxic materials, and limiting self-absorbance.

Clear Cube Corner Bike Reflector with Quantum Dot Embedded in Backside of the Plastic:

In another embodiment, QDs were applied to the inside of a commercially available clear/transparent bike reflector by mixing them with PMMA and a co-solvent (chloroform). This approach works well at producing a bright glow from reflector. However, the inside surface of the bike reflector is what gives the device its retroreflecting properties. When an additional polymer coating is applied on the inside, the cube-corner surface texturing was mostly lost, and so the retroreflective performance was reduced even as the glow was greatly enhanced. This mode may have applications where the glow is the primary desired feature, and it is a step towards the best mode (because the QDs are incorporated into the plastic of the reflector) from the coating example.

Photoluminescent Glass Spheres Containing Quantum Dots for Retroreflective Paint:

Typically, road paint and signage incorporate small glass or polymer spheres that reflect light back to the source like the internal cube-corner texturing of most bike reflectors. A paint formulation containing QDs was applied to a surface with polymer microspheres applied on top. The film exhibited both a red glow and retroreflective properties.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as the invention all that comes within the scope and spirit of these claims.

What is claimed is:

1. An optical apparatus, comprising:
   a retroreflective element; and
   a photoluminescent additive that down-converts a portion of incident light which is incident upon the optical apparatus, thereby imparting a colored glow to the apparatus and filtering the incident light;
   wherein said photoluminescent additive has a Stokes shift greater than 50 nm.

2. The apparatus of claim 1, wherein said photoluminescent additive is an organic dye.

3. The apparatus of claim 1, wherein said photoluminescent additive comprises a phosphor.

4. The apparatus of claim 1, wherein said photoluminescent additive comprises quantum dots.

5. The apparatus of claim 1, wherein said photoluminescent additive is substantially free of toxic elements.

6. The apparatus of claim 4, wherein said quantum dots comprise copper, indium, zinc, and sulfur.

7. An optical apparatus, comprising:
   a retroreflective element; and
   a photoluminescent coating on top of said retroreflective element that down-converts at least a portion of incident light, thereby creating a colored glow from the top surface, wherein said photoluminescent coating has a Stokes shift greater than 50 nm.

8. The apparatus of claim 7, wherein said photoluminescent coating comprises an organic dye.

9. The apparatus of claim 7, wherein said photoluminescent coating comprises a phosphor.

10. The apparatus of claim 7, wherein said photoluminescent coating comprises quantum dots.

11. The apparatus of claim 7, wherein said photoluminescent coating is substantially free of toxic elements.

12. The apparatus of claim 10, wherein said quantum dots comprise copper, indium, zinc, and sulfur.

13. The apparatus of claim 7, wherein said retroreflective element further comprises a photoluminescent additive.

14. A method for increasing the visibility of an object, comprising:
    disposing a photoluminescent retroreflector on the object, wherein said photoluminescent retroreflector exhibits a Stokes shift greater than 50 nm; and
    exposing the retroreflector to a light source such that said retroreflector produces a glow.

15. The method of claim 14, further comprising making an object more visible in low light environments.

16. The method of claim 14, further comprising making an object more visible and colorful for a design purpose.

17. The method of claim 14, further comprising making a road or road signs more colorful and more visible.

18. The method of claim 14, further comprising making a vehicle more visible for road safety at night.

19. The method of claim 14, further comprising making a bike or pedestrian more visible to cars at night.

20. The method of claim 14, further comprising making an object more visible or colorful for an artistic purpose.

21. The method of claim 14, wherein said photoluminescent additive has a Stokes shift greater than 50 nm.

22. The optical apparatus of claim 1, wherein said photoluminescent additive has an absorption spectrum that increases continuously over the portion of the spectrum going from 550 nm to 400 nm.

23. The method of claim 21, wherein said photoluminescent additive has an absorption spectrum that increases continuously over the portion of the spectrum going from 550 nm to 400 nm.

24. The optical apparatus of claim 1, wherein said photoluminescent additive has an absorption spectrum that increases continuously over the portion of the spectrum going from 550 nm to 400 nm.

25. The method of claim 21, wherein said photoluminescent additive has an absorption spectrum that increases continuously over the portion of the spectrum going from 550 nm to 400 nm.

26. The optical apparatus of claim 1, wherein said photoluminescent additive is $CuInZnS_2$.

27. An optical apparatus, comprising:
    a retroreflective element; and
    a photoluminescent additive that down-converts a portion of incident light which is incident upon the optical apparatus, thereby imparting a colored glow to the apparatus and filtering the incident light;
    wherein said photoluminescent additive has an adsorption band and an emission band which overlap over a spectral region R, wherein the emission band has a maximum value of $E_{max}$, wherein the maximum absorbance of the photoluminescent additive over the spectral region R is $A_{Rmax}$, and wherein the ratio $E_{max}/A_{Rmax}$ is greater than 4.

* * * * *